Figure 1:
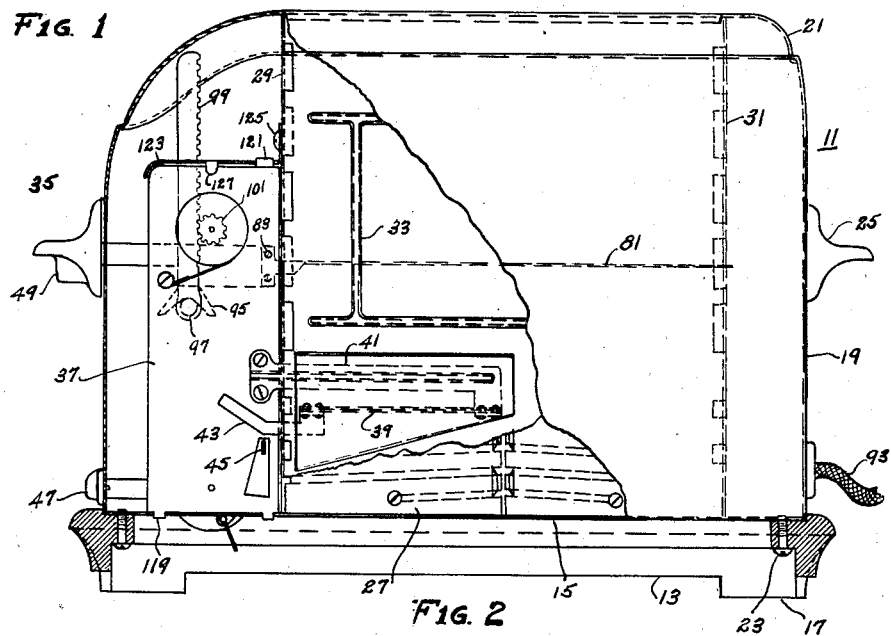

INVENTOR.
Murray Ireland

Feb. 14, 1939.   M. IRELAND   2,147,371
AUTOMATIC ELECTRIC TOASTER
Filed March 1, 1937   2 Sheets-Sheet 2
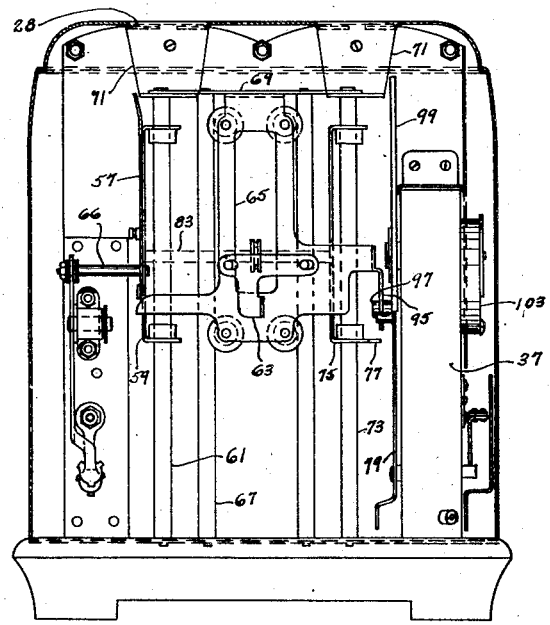
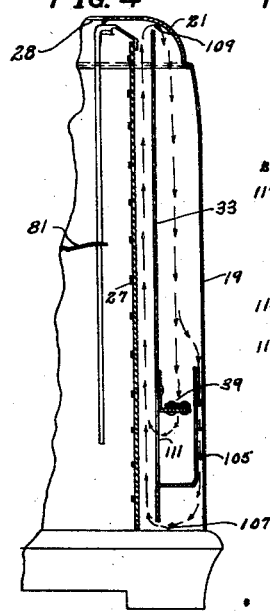
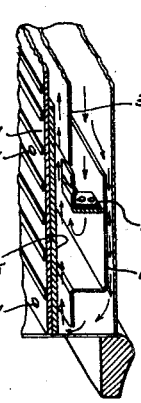
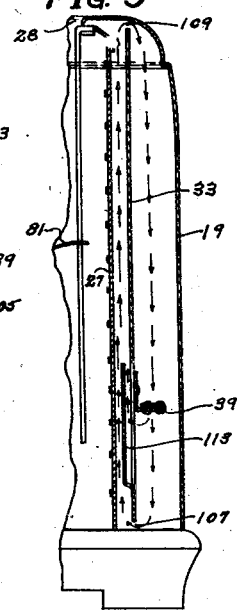
INVENTOR.
Murray Ireland
BY
ATTORNEYS.

Patented Feb. 14, 1939

2,147,371

UNITED STATES PATENT OFFICE 2,147,371

AUTOMATIC ELECTRIC TOASTER

Murray Ireland, St. Paul, Minn., assignor to McGraw Electric Company, Chicago, Ill., a corporation of Delaware Application March 1, 1937, Serial No. 128,403

20 Claims. (Cl. 219—19)

My invention relates to toasters and particularly to automatic electric toasters.

One object of my invention is to provide a thermally-responsive element, adapted to cooperate with a mechanical timer to vary the operating period of a heating or cooking device, that shall be positioned in a sharply defined closed circuit auxiliary current of heating air created by the main heating element of the cooking device and be shielded from external drafts.

Another object of my invention is to provide a means for controlling the duration of a toasting period including a thermally-actuable element shielded from external drafts reflecting changes in outside temperature.

Another object of my invention is to provide a thermal control element for a toaster, that shall be adapted to be subjected to the thermal effect of separate and distinct primary and secondary heat sources.

Another object of my invention is to provide a thermally-responsive timing mechanism adapted to control a toaster, that shall control the time period of operation of a toaster to ensure that successive slices of bread placed in a toaster will be toasted to substantially the same degree irrespective of temperature changes in the toaster.

Another object of my invention is to provide a thermally-responsive element adapted to cooperate with a mechanical timer to vary the time period of operation of a toaster, which element shall be positioned in a zone of relatively high temperature and simultaneously be subjected to a convection current of heating air.

Another object of my invention is to provide a unitary thermally controlled timing mechanism that shall be insertable into and removable from a toaster as a unit.

Another object of my invention is to provide a unitary thermally controlled timing mechanism including a mechanical timer and a thermally-actuable element in which the timer is located outside of the toasting chamber while the thermally-actuable element is located closely adjacent and subject to the temperature of the toasting chamber.

Other objects of my invention will either be apparent from the description of several modifications and devices embodying my invention or will be pointed out in the course of such description.

Figure 2:
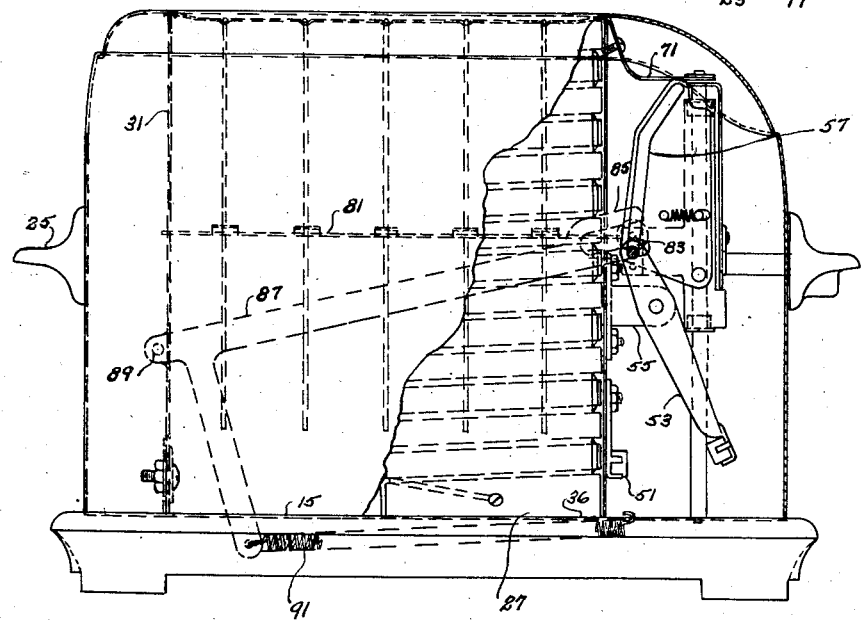

In the drawings,

Figure 1 is a view mainly in side elevation but with parts broken away of a toaster embodying my invention, Fig. 2 is a view, in side elevation as seen from the other side thereof, with parts broken away to show the interior construction, Fig. 3 is a view in front elevation thereof with the casing removed, Fig. 4 is a fragmentary sectional view laterally of the toaster, Fig. 5 is a view similar to that shown in Fig. 4 but showing a modified form, and, Fig. 6 is a fragmentary view of still another modification.

A toaster designated generally by the numeral 11 includes a skeleton frame 13 which may have a metal plate 15 at its upper face and which may also have feet 17 to raise the base above a table or other support during operation of the device.

An outer casing includes side walls 19 of thin sheet metal and a cover 21, means being provided in the shape of short machine screws 23 to secure the walls 19 of the casings against the top of the base to hold the outer casing in proper operative position thereon. A rear knob 25 is fixedly mounted on the casing to permit of carrying the toaster while hot.

Pairs of electric heating elements 27 including sheets 27a of electric insulating material such as mica, and a resistor 27b thereon, extend vertically within the toaster, two spaced elements of this kind being provided for each slice of bread which may be adapted to be toasted in a toaster of this kind and any desired number of such pairs of heating elements may be provided. Substantially all of the resistor wire or strip is located against the inner faces of its support 27A so that the slice of bread being toasted may be subjected to high temperature radiant heat, the resistor usually operating at dull or even bright red heat. A number of openings 28 corresponding to the numbers of pairs of spaced opposed heating elements, are provided in the cover to permit of insertion and removal of slices of bread to be operated upon.

A front intermediate wall 29 and a rear intermediate wall 31 extend laterally of the toaster within the casing and baffle plates 33 are located between the respective side wall of the casing and an adjacent or outer heating element 27. The baffle plates and the front and rear intermediate walls cooperate to define a toasting chamber, while the front intermediate wall 29 cooperates with the front wall of the casing and portions of the side walls of the casing to define a mechanism chamber 35. An opening 36 may be provided in the bottom plate 15 between each pair of heating elements to permit ingress of a through draft of ventilating air adapted to flow through the toasting chamber, as is already well known in the art.

A thermally-responsive timing mechanism of unitary construction and assembly includes a mechanical timer 37 located in the mechanism chamber 35 substantially as shown in Figs. 1 and 3 of the drawings. A thermally responsive element 39 is supported solely by the timer 37 as by a bracket arm 41 and has a cam surface 43 secured to its movable end which cam surface is adapted to engage a speed adjusting member 45 to vary the speed of the mechanical timer when the same is a variable speed timer.

Reference is here made to my copending application Ser. No. 128,402 filed as of even date herewith and assigned to the same assignee as is the present application. This copending application discloses and claims the general details of construction of the unitary structure whereas in this application I disclose and claim a device of this kind mounted in and adapted to control a cooking device such as a toaster.

Means for manually adjusting the speed of the timer 37 includes a knob 47 on the outside of the casing at the front thereof which may be turned to vary the speed of the timer and reference may here be made to my issued Patent No. 1,866,808 assigned to the same assignee as is the present application for further details of construction of the timer.

A knob 49 is manually movable in a downwardly direction to simultaneously effect closing of a control switch for controlling the supply of current to the heating means 27, for moving a slice of bread to toasting position and also for simultaneously winding said timer.

The control switch for the heating elements includes a contact member 51 mounted on and insulated from the front intermediate wall 29 and a switch arm 53 which is pivotally mounted intermediate its ends on a bracket 55 also supported by the front intermediate wall. The switch arm 53 is actuated by a slotted plate 57 supported on a slider 59 vertically movable on a standard 61 and adapted to be moved downwardly by the knob 49 which is mounted on a part 63 having a loose mounting on a carriage 65. The upper end of arm 53 has a rod 66 extending therefrom adapted to move in the slot in plate 57.

The carriage is movable on a pair of spaced standards 67, the lower ends of which fit into plate 15 and the upper ends of which are held by a cross bar 69 which in turn is held by upper longitudinally extending frame members 71. A fourth standard 73 is provided to the right of the other standards already described and has a slider 75 vertically movable thereon having a latching portion 77 thereon at the bottom thereof. Thus, when knob 49 is pressed downwardly through a fixed distance carriage 65 and sliders 59 and 75 are moved downwardly, the slotted plate 57 causes closing the switch controlling the electric heating elements and the latch portion 77 is adapted to be held by a pivotally mounted latch arm 79 mounted on the timer structure.

Bread slice supports 81 are provided, one between each pair of opposed spaced heating elements and are adapted to be moved into toasting position near the bottom of the toasting chamber and into non-toasting position near the upper end of the heating elements, as shown in Figs. 1, 2, 4 and 5.

The two bread slice supports are connected by a rod 83 which has an enlarged centrally grooved roller thereon intermediate its ends adapted to move in the slotted front end 85 of a bell crank lever 87 pivotally mounted at 89 on the rear intermediate plate 31. The ends of rod 83 are secured to rearwardly extending portions of sliders 59 and 75 to cause the sliders 59 and 75, rod 83, bread slice supports 81 and slotted plate 57 to move together. The depending arm of bell crank lever 87 has one end of a biasing spring 91 secured thereto, the other end of which is secured to plate 15 or to the base near the front thereof, to bias the control switch to open position and the bread slice supports to non-toasting position. These details constitute no part of my invention since they are already old and well known in the art and only enough description thereof is here given to show how the device more particularly embodying my invention cooperates with these parts to control the duration of a toaster operation.

Briefly, the operation of a toaster of this kind is substantially as follows: Let it be assumed that a twin conductor cord 93 has had its outer end connected to a suitable source of supply of electric energy and that one or more slices of bread have been placed in the toaster through the openings 28 in the top of the toaster, the slices of bread resting upon the supports 81 and usually partially projecting above the top of the casing. The operator now depresses knob 49 which effects lowering of the bread slice supports to substantially the bottom of the toasting chamber or into toasting position, simultaneously effects closing of the switch by turning movement of switch arm 53 and winding of the mechanical timer by means of a projecting member 95 on carriage 65 which is adapted to engage a lug 97 secured to the lower end of a rack bar 99. This rack bar engages a pinion 101 on the shaft of the spring 103 of the timer in such manner that when the rack bar is moved downwardly the spring is wound to a predetermined degree and since it is necessary that the carriage and particularly slider 75 be moved to the full extent of their downward travel to insure that members 77 and 79 will properly engage, the timer will be fully wound. The latch holds the switch closed and the bread slice supports in toasting position until released at the end of a toasting operation.

As the toasting operation progresses, the toaster temperature increases and a shorter time will be required for a second and a third toasting operation. The thermal element 39 subject to toaster temperature as will be hereinafter more clearly set forth, is adapted to move downwardly with increase of temperature so that the cam surface 43 will engage speed adjusting member 45 causing the speed of the timer to increase and causing the duration of a toaster operation to decrease with increasing temperature of the toaster.

It will be noted that the thermal element is shielded from external drafts, from drafts not of substantially toaster temperature as well as from drafts reflecting changes in the temperature of air outside of the toaster.

Referring to Fig. 4 of the drawings, I have illustrated one position of the bimetal element 39 relatively to a baffle plate 33 and a heating element 27. In this construction, the baffle plate 33 has a portion 105 adjacent the lower end punched out laterally of its plane so that the part 105 is on the outside of bimetal bar 39 or between the bimetal bar and the casing 19.

A bimetal element is therefore subjected simultaneously to the relatively high temperature radiant heat from adjacent heating element 27 and also to radiant heat emanating from the heating element 27, striking the inner surface of portion 105 and being reflected therefrom, some of these rays falling on the bimetal element to heat the same. The temperature of this reflected radiant heat is of course slightly lower than that radiated directly from the heating element onto the thermal element.

Fig. 4 of the drawings illustrates a gap 107 provided between the bottom of the baffle plate 33 and the top of the base and a gap 109 between the top of the baffle plate and the cover 21. The result of this construction is the creation of a sharply defined closed circuit current of heating air by the heating element 27 when the same is energized, which current will in general have the path shown by the broken line, the arrows indicating the general direction of movement of said heating air. Since the temperature of the heating means, and by this is to be understood not only the resistor wire but also the support therefor, is greater than that of the casing, the flow of this convection current of a heating air is upwardly between the baffle plate and the heating element and downwardly between the baffle plate and the casing. It is further obvious that the opening 111 in the baffle plate caused by punching out a part 105 thereof will also aid in providing an opening through which the current of heating air may flow at substantially the lower part of its travel.

Referring now to Fig. 5 of the drawings, I have there shown a modification of construction of the baffle plate 33 in which a laterally punched-out portion 113 is positioned between the heating element 27 and the baffle plate so that the thermal element 39 is screened from radiant heat impinging upon it directly from the heating means 27. It is however subjected to transmitted or secondary radiant heat from the heating means 27, this heat being that received from part 113 of the baffle plate which is heated by radiant heat directly from the heating element 27 which is the primary heat source. Since portion 113 is located relatively close to the heating means the heat radiated by said portion 113 will have a temperature but slightly below that of the heating means itself.

Gaps 107 and 109 at the bottom and at the top respectively of the baffle plate may be provided as was done in the construction shown in Fig. 4 of the drawings and the broken lines indicate the path of travel of a closed circuit convection current of heating air of relatively high temperature caused by the heating means and sharply defined by the baffle plate and separated thereby into an ascending stream between the baffle plate and the heating element and a descending stream between the baffle plate and the casing, the same as in the construction shown in Fig. 4.

Referring now to Fig. 6 of the drawings, I have there illustrated a still further modification of means for subjecting the thermal element 39 to toaster temperature using the same construction of baffle plate 33 as shown in Fig. 4 of the drawings, namely, an outwardly displaced portion 105 of the baffle plate 33 positioned between the bimetal bar 39 and the casing. A secondary heat radiating plate 115 is secured against the outside surface of the heating element 27 as by suitable rivets 117 so that its temperature is substantially that of the heating means but the bimetal bar is thereby screened from radiant heat impinging upon it directly from the heating element. It is obvious of course that the temperature of the radiant heat given off by plate 115 is but little below that of the heating means itself.

The bimetal bar 39 is subjected to the same convection current of heating air as has already been described for the construction shown in Fig. 4 of the drawings.

I am fully aware of a number of other forms of toasters embodying a mechanical timer and a thermally-actuable means cooperating therewith to vary the duration of an operating period of a toaster with variations in the temperature of the toaster. Reference may be made for instance to Forbes Patent No. 1,665,375 disclosing and claiming a device of this kind in which the bimetal bar is positioned between a baffle plate and the casing, which casing has louvres in its side wall so that a continuous stream of ventilating and therefore cooling air flows past the bimetal bar and it is obvious that this air stream has a relatively low temperature and flows in one direction only within the toaster.

I am also aware of a thermally controlled variable speed timing mechanism in which the bimetal element is located within the toasting chamber and in substantially the bottom portion thereof and therefore subject to the radiant heat from the heating means as well as to a continuous through stream of cooling air entering the toaster through openings in the base and leaving through openings in the top part of the casing provided for insertion and removal of slices of bread. The temperature of the air at the time when it comes in contact with the bimetal bar is therefore quite low so that it has a marked cooling effect on the bimetal bar.

It has heretofore been considered desirable, if not necessary, that the thermal element in a structure of this kind be subjected to a stream of cooling air, such as a through draft, in order that it may cool quickly during the intervals of time between toasting operations. It is obvious that the durations of the intervals between operating periods of the toaster may be anything from that necessary to remove toasted slices of bread, insert new slices and then start a new operation of the toaster, to a length of time during which the toaster cools to room temperature.

The inventive concept underlying my invention, particularly as to the location of the thermally-responsive control element is quite different and novel and is an improvement on devices thus far known and used. I subject the thermal element to relatively high temperature, that is it is subjected to radiant heat reaching it directly from the heating means as well as to secondary heat sources and at the same time it is subjected to a closed circuit convection current of heating air, preferably sharply defined and directed by suitable means so that during the time that the heating elements are energized and the toaster is in actual use, the temperature of the thermal element will be relatively high. Since the heating means is de-energized at the end of each toasting operation, the toaster and particularly the toasting chamber will cool after each operation and it is found that this cooling takes place very rapidly. The result of this rapid cooling is that the thermal element also cools very rapidly and since the radiation of heat from a heated mass varies substantially as the fourth power of the temperature, it is obvious that the temperature drop in the bimetal element will be very rapid immediately after the heating elements have been de-energized and further that it is desirable to operate the thermal element at relatively high temperatures to obtain such quick cooling.

It is obvious further that the convection current of heating air, being sharply defined by means such as a baffle plate, will be highly effective not only in heating the bimetal element during operation of the toaster but also in cooling the same since the temperature of the air in the convection current decreases rapidly after de-energization of the heating element. The operation of the thermal element is therefore such as to follow very closely the change in the temperature of the toaster, the changes in temperature of which affect the duration of an operating period of the toaster.

The effect of a closed circuit convection current of heating air on a thermal element is to cause the thermal element to follow very closely the temperature changes of the surfaces which define the closed circuit current of heating air. Since in the structure disclosed, the surfaces which determine the temperature of the closed circuit convection current are also the surfaces which substantially control the length of time required for a toasting operation, it follows that a thermal element located in such a convection current will indicate changes in the length of time required to effect a proper toasting operation with greater fidelity than if the thermal element were located in still air, or in a draft of air the temperature of which is substantially independent of the surfaces the temperature of which controls the length of time required for proper toasting.

It may be noted that the thermally-actuable element is adapted to be subjected to the thermal effect of separate and distinct primary and secondary heat sources. Thus, there is the relatively high temperature radiant heat directly from the electric heating means, the radiant heat from a plate interposed between the heating means and the thermal element, the temperature of which secondary radiated heat is only slightly less than that of the primary heat source, the radiant heat reflected back to the thermal element, the heat conducted to the thermal element from its supporting bracket as well as the heat absorbed by the thermal element from the closed circuit convection current of heating air. It may be noted also that the temperature of the heat from the various sources, the electric heating means being the primary source and all the others being secondary heat sources, is relatively high, since as has already been stated the resistor normally operates at least at substantially dull red heat. Then too, the location of the thermal element is such as to shield it from external drafts, from drafts reflecting changes in temperature outside of the toaster and also from drafts not of substantially toaster temperature.

The unitary construction, the details of which are disclosed and claimed in my copending application Ser. No. 128,402 filed as of even date herewith and assigned to the same assignee as is the present application has a number of additional advantages when associated with a toaster, among which may be mentioned the fact that distortion of the toaster frame upon which the thermal element has been heretofore mounted, relatively to the timer structure, have no effect whatever in the present construction. It is a relatively simple matter to adjust the bimetal element relatively to the speed adjusting member 45 of the timer so that all toasters or other cooking appliances of this general type will have the same operating characteristics when assembled in mass manufacture, so that irrespective of variations in the operating condition, such as line voltage, ambient temperature, (such as in winter or in summer) will have relatively little if any disturbing effect upon the desired accuracy of control with the result that a device of this kind will toast successive slices of bread to substantially the same degree irrespective of line varying voltage within normal limits of variation, ambient temperature, different kinds of bread, and particularly the temperature of the toaster structure itself.

I wish to here point out another obvious advantage of the location of the thermal element 39 when positioned between the heating element and the side wall of the outer casing, namely, that there is little or no chance of foreign matter falling on the bimetal element such as almost inevitably occurs where the bimetal element is located in the lower portion of the toasting chamber and substantially below the slice of bread being toasted.

In order to aid the manufacturer in quick assembly of the thermally-responsive timing mechanism in or on a toaster, the lower ends of the side walls of the timer structure may be provided with extensions 11 (see Fig. 1 of the drawings) adapted to fit into openings in the metal plate 15 of the base. The upper end of the timer structure may have extensions 121 on the side plates interfitting with a holding bracket 123 having a portion adapted to overlie the top of the timer and another portion adapted to extend along and in front of the intermediate wall 29 against which it may be secured by short machine screws 125. Bracket 123 may be provided with depending lugs 127 overlapping the sides of the timer and I wish to call particular attention to the fact that the bracket 123 interfits loosely with the top end of the timer structure in order that slight inaccuracies in manufacture will not slow up assembly of the timing mechanism in the toaster. Consideration of the operation of the timer and of the forces exerted thereby during operation thereof will show that these forces tend to hold the timer structure against the top of the base so that the loose interfit between the bracket 123 and the top of the timer will not be attended by any disadvantageous results.

It is to be further noted that the mechanical timer while described and illustrated as a variable speed timer may also be a constant speed timer and reference may be had to my copending application Ser. No. 128,402 for description of such a constant speed thermally controlled timer. The timer itself is adapted to be positioned in the mechanism chamber and the thermally-actuable control element is positioned in or closely adjacent to the toasting chamber and is subject to the relatively high temperature of the heating elements.

While I have illustrated and described a thermally-responsive element supported solely by the timer, my invention in its broadest aspect is not limited thereto as to its position in a current of heating air and subject to direct, transmitted and reflected radiant and conducted heat from the heating means. Any other substantially fixed support for the thermal element is intended to be comprehended in and covered by the claims.

Since the bimetal thermostat is not subjected directly to the thermal effect of a through draft of ventilating air entering at opening 36 and leaving at opening 28, it is possible to so design and construct the toaster as to cause the optimum amount of ventilating air to flow through the toasting chamber to obtain the best operating results, without reference to the control of the thermostat.

Tests which have been made on a number of toasters of this kind have indicated that they operate in a very satisfactory manner and this operation is ascribed by me to reasons which have been set forth hereinbefore in connection with the discussion of the heating and cooling of the bimetal bar with the heating and cooling of the toaster structure itself.

Further modifications may be made in the device embodying my invention without departing from the spirit and scope thereof and I desire therefore that only such limits shall be placed thereon as are imposed by the prior art or are set forth in the appended claims.

I claim as my invention:

1. A toaster comprising an outer casing, heating means therein, a baffle plate between the heating means and the casing, a toasting chamber defined in part by the baffle plate, means for initiating a toasting operation and means for terminating a toasting operation, said terminating means including a variable speed mechanical timer and a bimetal bar adapted to control the speed of the timer to vary the operating period of the toaster, said bimetal bar being positioned to present its flat side to a closed circuit current of heating air caused by said heating means, the downwardly and upwardly moving columns of air being sharply defined and separated by said baffle plate.

2. A toaster comprising a casing, a toasting chamber therein, heating means in said chamber, means for initiating a toasting operation and means for terminating a toasting operation, said terminating means including a mechanical timer positioned outside of the toasting chamber and a thermally-actuable member for cooperating with the timer to vary the duration of an operating period of a toaster in accordance with the temperature of the toaster, said thermally-actuable member having a portion fixedly supported solely by the timer and being positioned adjacent to the toasting chamber and subject to the temperature thereof.

3. A toaster comprising a toasting chamber, heating means therein, means for initiating a toasting operation and means for terminating a toasting operation, said terminating means including a variable speed mechanical timer and a bimetal element having a portion fixedly supported solely by the timer out of close heat interchanging relation with the timer for controlling the timer speed to vary the time period of a toasting operation in accordance with the temperature of a toaster, the timer being positioned outside of the toasting chamber and the bimetal element being positioned closely adjacent to the toasting chamber subject to the temperature thereof and means cooperating with said heating means for causing said bimetal element to be subjected to a sharply defined closed circuit convection current of heating air caused by the energized heating means.

4. A toaster comprising a toasting chamber, heating means therein, means for initiating a toasting operation and means for terminating a toasting operation, said terminating means including a variable speed mechanical timer positioned outside of the toasting chamber and a thermally-actuable member having a portion fixedly supported solely by the timer for controlling the speed thereof to vary the time period of operation of a toaster in accordance with the temperature of the toaster, and means to cause said thermally-actuable member to be affected by direct radiant and by reflected radiant heat from the heating means when energized and by a sharply defined closed circuit convection current of heating air caused by the heating means when energized.

5. A toaster comprising a toasting chamber, heating means therein, means for initiating a toasting operation and means for terminating a toasting operation, said terminating means including a variable speed mechanical timer positioned outside of the toasting chamber, a thermally-actuable member having a portion fixedly supported solely by the timer for controlling the speed thereof to vary the time period of operation of a toaster in accordance with the temperature of the toaster, and means cooperating with said heating means to create a sharply defined closed circuit convection current of heating air, said thermally-actuable member being positioned closely adjacent to the toasting chamber and subject to the temperature thereof and in position to be affected by said sharply defined current of heating air.

6. A toaster comprising a plurality of walls defining a toasting chamber, heating means therein, means for initiating a toasting operation and means for terminating a toasting operation, said terminating means including a mechanical timer positioned outside of the toasting chamber, a thermally-actuable member, effective to cooperate with the timer to vary the time period of operation of the toaster in accordance with the temperature of the toaster, and means including one of the walls of said toasting chamber cooperating with said heating means to create a sharply defined closed circuit convection current of heating air, said thermally-actuable member having a portion fixedly supported solely by the timer closely adjacent to the toasting chamber and subject to the temperature thereof and in position to be affected by said sharply defined current of heating air.

7. A toaster comprising a toasting chamber, heating means therein, means for initiating a toasting operation and means for terminating a toasting operation, said terminating means including a mechanical timer positioned outside of the toasting chamber, a thermally-actuable member for cooperating with the timer to vary the time period of operation of the toaster in accordance with the temperature of the toaster, means closely adjacent to said heating means to screen said thermally-actuable member from radiant heat directly from said heating means and means cooperating with said heating means to create a sharply defined closed circuit convection current of heating air, said thermally-actuable member being supported solely by the timer in position to be affected by radiant heat from said screen having a temperature but slightly below that of the heating means and to said sharply defined convection current of heating air.

8. A toaster comprising an outer casing, heating means therein, a baffle plate between the heating means and the outer casing, a toasting chamber defined at least in part by said baffle plate, means for initiating a toasting operation and means for terminating a toasting operation, said terminating means including a variable speed mechanical timer positioned outside of the toasting chamber and a bimetal element having a portion fixedly supported solely by the timer and effective to control the speed of the timer to vary the time period of operation of a toaster in accordance with the temperature of the toaster, and means including said baffle plate to cause said bimetal element to be affected by a closed circuit current of heating air caused by the heating means and sharply defined and directed by said baffle plate.

9. A toaster comprising an outer casing, heating means therein, a baffle plate between the heating means and the casing, a toasting chamber defined in part by the baffle plate, means for initiating a toasting operation and means for terminating a toasting operation, said terminating means including a mechanical timer and a thermally-actuable element effective to cooperate with the timer to vary the time period of operation of a toaster, means including said baffle plate for causing said thermally-actuable element to be subjected to a closed circuit convection current of heating air caused by the heating means when energized and having its upwardly and downwardly moving columns flowing along the major portions of the two sides of the baffle plate.

10. A toaster comprising an outer casing, heating means therein, a baffle plate between the heating means and the casing, a toasting chamber, defined in part by the baffle plate, means for initiating a toasting operation and means for terminating a toasting operation, said terminating means including a variable speed mechanical timer and a bimetal bar effective to control the speed of the timer to vary the operating period of a toaster in accordance with the temperature of the toaster, means including said baffle plate cooperating with said heating means to cause said bimetal bar to be subjected to a closed circuit convection current of heating air caused by the heating means, the upwardly and downwardly moving columns of air being separated and directed by said baffle plate.

11. A device as set forth in claim 9 in which the thermally-actuable element is subjected also to radiant heat directly from the heating means when energized.

12. In a toaster, the combination with a casing, heating means therein, a baffle plate positioned between the casing and the heating means and means to effect energization of the heating means, of means including a thermally-actuable element positioned to be subjected to a closed circuit convection current of heating air, the upwardly and downwardly moving columns of air being separated and directed by the baffle plate, for automatically effecting deenergization of the heating means after a time interval the length of which varies in accordance with the temperature of the toaster to obtain uniform toasting of successive slices of bread in a toaster irrespective of temperature changes in the toaster.

13. A toaster as set forth in claim 12 in which the baffle plate is so shaped and constructed as to cause the thermally-actuable element to be subjected also to direct and to reflected radiant heat generated by the heating means.

14. In a toaster, the combination with a casing, heating means therein, and means to effect energization of the heating means, of means to effect deenergization of the heating means including a variable speed mechanical timer and a thermally-actuable element controlling the speed of the timer to vary the duration of a toasting operation in accordance with changes in the temperature of the toaster, said thermally-actuable element being positioned to be affected by a sharply defined closed circuit current of heating air created by the heating means and means including a baffle plate at one side of the heating means for causing separation of the upwardly and downwardly moving columns of heating air.

15. In a toaster, the combination with a casing, heating means therein and means to effect energization of the heating means, of means to effect deenergization of the heating means including a mechanical timer and a thermally-actuable element supported solely from the timer and cooperating therewith to cause the timer to vary the duration of an operating period of a toaster in accordance with changes in the temperature of the toaster, said thermally-actuable element being positioned to be affected by a sharply defined closed circuit current of heating air created by the heating means and means including a baffle plate between the heating means and the casing to effect separation of the upwardly and downwardly moving columns of heating air.

16. In a toaster, the combination with a casing, heating means therein, and means to effect energization of the heating means, of means to effect deenergization of the heating means including a thermally-actuable member having a substantially stationary support and positioned to be affected by a sharply defined closed circuit convection current of heating air created by said heating means and means including a baffle plate between the heating means and the casing for causing separation of the upwardly and downwardly moving columns of heating air.

17. In a timer, the combination with a casing, heating means therein, and means to initiate a toasting operation, of means to automatically terminate a toasting operation including a thermally-actuable member positioned to be subjected to a sharply defined closed circuit convection current of heating air created by the heating means and means in said casing to separate the upwardly and downwardly moving columns of said current of heating air.

18. In a toaster, the combination with a casing, heating means therein, a bread slice support movable into toasting and non-toasting position relatively to said heating means and means to move the support into and hold it in toasting position, of automatic means to cause movement of the support into non-toasting position after a time interval dependent on the temperature of the toaster, said automatic means including a thermally-actuable element located to be subjected to a sharply defined closed circuit convection current of heating air caused by the heating means, and means including a baffle plate positioned to cause the rising column of heating air to flow along one side thereof and the descending column of heating air to flow along the other side thereof.

19. In a toaster, the combination with a casing, heating means therein, a bread slice support movable into toasting and into non-toasting positions relatively to said heating means and means to move the bread slice support into and hold it in toasting position, of automatic means effective to cause movement of the bread slice support into a non-toasting position after a length of time dependent on the temperature of the toaster, said automatic means including a mechanical timer, a thermally-actuable element having a portion fixedly supported solely by the timer and effective to cooperate therewith to vary the length of time before the bread slice support is returned to its non-toasting position and located to be affected by a sharply defined closed circuit convection current of heating air within said casing caused by the heating means and means in said casing and cooperating with the casing and the heating means to separate and direct the upwardly and downwardly moving columns of said current of heating air.

20. In a toaster, the combination with a casing, a toasting chamber in the casing, a heating element in the toasting chamber and means to initiate a toasting operation, of means to automatically terminate a toasting operation after a time interval and including a bimetal element having a substantially stationary support positioning it outside of the toasting chamber, a plate positioned closely adjacent to the heating element to receive radiant heat therefrom and to radiate heat to said bimetal element, the temperature of the radiant heat affecting said bimetal element being but slightly below that of the heating element, and means including a baffle plate between the heating element and the casing to cause said bimetal element to be subjected to a closed circuit convection current of heating air, the ascending and descending columns of which are separated by the baffle plate.

MURRAY IRELAND.